(12) United States Patent
Kamiguchi et al.

(10) Patent No.: US 6,365,075 B1
(45) Date of Patent: Apr. 2, 2002

(54) METHOD AND APPARATUS FOR CONTROLLING TORQUE OF AN INJECTION MOLDING MACHINE

(75) Inventors: Masao Kamiguchi; Tatsuhiro Uchiyama, both of Minamitsuru-gun (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/577,587

(22) Filed: May 25, 2000

(30) Foreign Application Priority Data

May 25, 1999 (JP) .......................................... 11-144370

(51) Int. Cl.[7] ............................................... B29C 45/77
(52) U.S. Cl. ..................... 264/40.3; 264/40.7; 425/145; 425/149
(58) Field of Search ................................ 425/149, 145; 264/40.3, 40.7

(56) References Cited

U.S. PATENT DOCUMENTS 5,362,222 A * 11/1994 Faig et al. .................. 425/145

FOREIGN PATENT DOCUMENTS

| JP | 6110524 A | 5/1986 |
| JP | 07205228 A | 8/1995 |

\* cited by examiner

Primary Examiner—Tim Heitbrink
(74) Attorney, Agent, or Firm—Staas & Halsey LLP

(57) ABSTRACT

A metering controller capable of making a metering time constant and kneading of resin uniform. A screw torque $STRQ(n)$ is detected and stored at every processing period from a start of metering as reference data. A screw rotational speed command is changed over to a set value at each predetermined changeover position. A present screw torque is detected and subtracted from a corresponding screw torque $STRQ(n)$ of the reference data to obtain a deviation $\Delta TRQ$. A correction amount $SROT$ for the screw rotational speed command is obtained based on the deviation $\Delta TRQ$. The correction amount $SROT$ is added to the set screw rotational speed command $SRCMD$ and thus corrected command is outputted for controlling a servomotor for rotating the screw. A screw retracting speed and a screw retracting position may be adopted as reference data. Since a transition pattern of the screw retracting motion coincides with that in obtaining the reference data, the metering time is made constant.

20 Claims, 13 Drawing Sheets

FIG.4

SETTING OF SCREW ROTATIONAL SPEED

| STAGE i | CHANGEOVER POSITION | ROTATIONAL SPEED |
|---|---|---|
| 0 |  | 20 rpm |
| 1 | 20 mm | 30 rpm |
| 2 | 30 mm | 50 rpm |
| 3 | 45 mm | 70 rpm |
| ⋮ | ⋮ | ⋮ |
| N | 55 mm | 30 rpm |

| METERING COMPLETION POSITION | 65 mm |
|---|---|

METHOD AND APPARATUS FOR CONTROLLING TORQUE OF AN INJECTION MOLDING MACHINE

BACKGROUND OF THE INVENTION

1. Field of the Invention

The present invention relates to an injection molding machine of an in-line screw type, and more particularly to a controller for controlling a metering process of an injection molding machine.

2. Description of Related Art

As for a conventional method of metering resin in an injection molding machine of an in-line screw type, it has been general to control a screw retracting force, namely a back pressure to be opposed to molten resin in a cylinder, in order to enhance kneading of resin by an injection screw. In this method, time needed for the metering is dispersed and utilized as a factor for determining whether the metering process is carried out successfully or not.

There is proposed a method of controlling a retracting speed of an injection screw to be held at a predetermined value in the metering so as to make the metering time constant, in Japanese Patent Publications Heisei 7-205228 and Showa 61-110524.

SUMMARY OF THE INVENTION

An object of the present invention is to provide a metering controller capable of making a metering time constant and kneading of resin uniform in a metering process of an injection molding machine.

According to one aspect of the present invention, a metering controller for an injection molding machine comprises: detecting means for detecting a rotational torque exerted on a screw; a memory to store the detected rotational torque in time series from a start of a metering process as reference torque; and a processor to correct a rotational speed of the screw based on the reference torque stored in the memory and a rotational torque of the screw detected in an actual metering process, thereby the screw rotational speed is controlled so that a transition pattern of the screw torque traces the transition pattern of the reference torque, thereby reducing dispersion of the metering time.

Instead of storing the detected torque of the screw in time series from a start of a metering process, the memory may store the detected torque with an axial position of the screw to be associated therewith in a metering process, and the processor corrects a rotational speed of the screw based on the reference torque stored in the memory and a rotational torque of the screw detected by the torque detecting means in an actual metering process.

In order to correct the rotational speed of the screw, the processor calculates a correction amount based on a deviation between the reference torque and the torque in the actual metering process, and corrects a predetermined rotational speed command for the screw based on the correction amount. The processor may restrict the correction amount not to exceed an upper limit or a lower limit set for the correction amount. Values of the rotational speed command may be respectively set for a plurality of stages of the metering process.

According to another aspect of the present invention, a metering controller for an injection molding machine comprises: a detector to detect a retracting speed of a screw; a memory to store the retracting speed detected by the detector in time series from a start of a metering process as reference retracting speed; and a processor to obtain a correction amount for a rotational speed of the screw based on the reference retracting speed stored in the memory and a retracting speed of the screw detected by the detector in an actual metering process, restrict the correction amount not to exceed an upper limit and a lower limit or the lower limit set for the correction amount, and correct the rotational speed of the screw in accordance with the correction amount. Command values of the rotational speed may be respectively set for a plurality of stages of the metering process.

Instead of storing the retracting speed detected by the detector in time series from a start of a metering process, the memory stores the detected retracting speed with an axial position of the screw to be associated therewith in a metering process, and the processor obtains a correction amount for a rotational speed of the screw based on the reference retracting speed stored in the memory and a retracting speed of the screw detected by the detector in an actual metering process, restricts the correction amount not to exceed an upper limit or a lower limit set for the correction amount, and corrects the rotational speed of the screw in accordance with the correction amount.

According to still another aspect of the present invention, a metering controller for an injection molding machine comprises: a position detector to detect an axial position of a screw; a memory to store the axial position detected by the position detector in time series from a start of a metering process as reference position; and a processor to correct a rotational speed of the screw based on the reference position of the screw stored in the memory and a position of the screw detected by the position detector in an actual metering process.

In order to correct the rotational speed of the screw, the processor calculates a correction amount based on a deviation between the reference position and the position of the screw in the actual metering process, and corrects a predetermined rotational speed command for the screw based on the correction amount. The processor may restrict the correction amount not to exceed an upper limit an a lower limit or the lower limit set for the correction amount. Values of the rotational speed command may be respectively set for a plurality of stages of the metering process.

BRIEF DESCRIPTION OF THE DRAWINGS

FIG. 4 is a chart of an example of positions for changing rotational speed of a screw, rotational speed and a position of completion of metering;

DETAILED DESCRIPTION OF THE PREFERRED EMBODIMENTS

Figure 1:
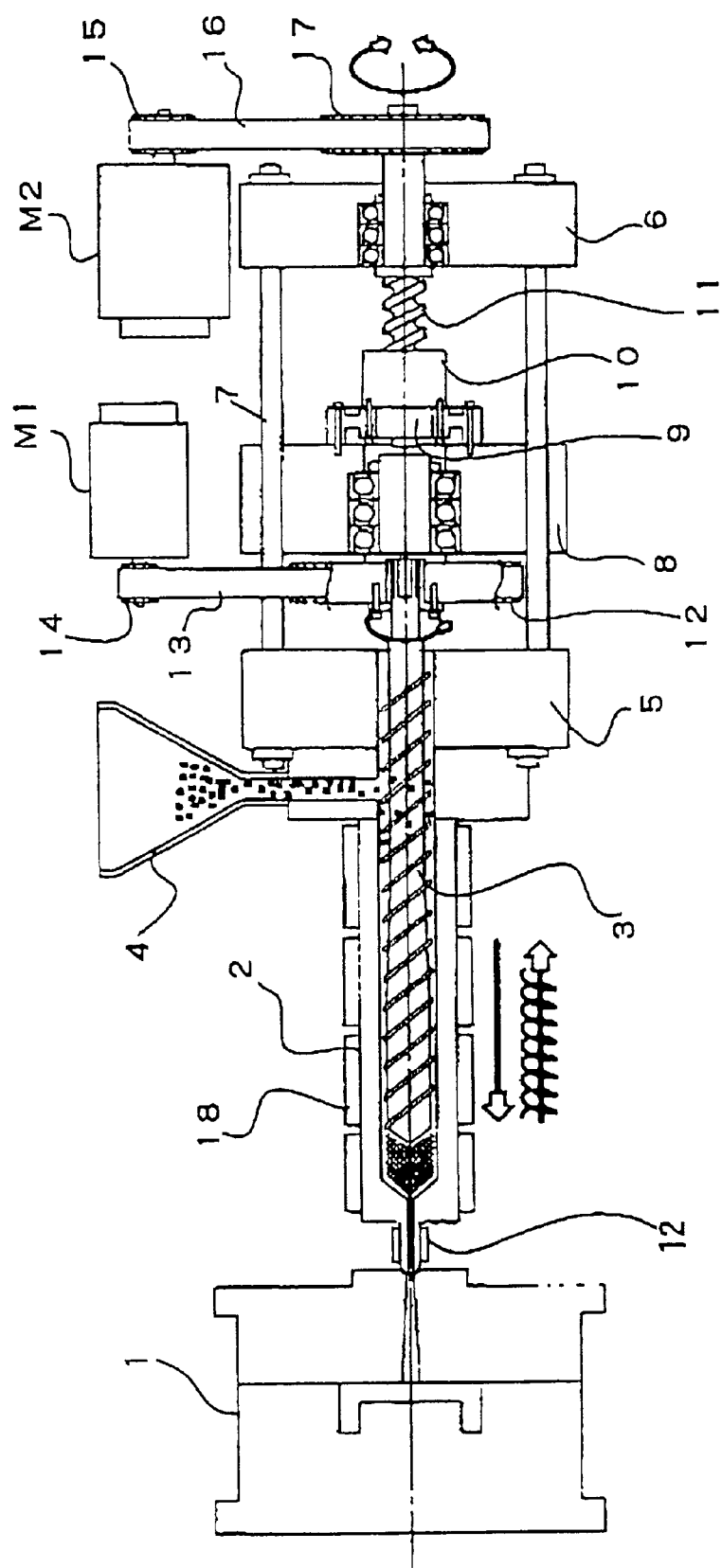
FIG. 1 is a schematic view of an injection mechanism of an injection molding machine to which a metering controller of the present invention is applied.

An injection molding machine to which the metering controller of the present invention is applicable is described referring to FIG. 1. In FIG. 1, a reference numeral 1 denotes a mold set, 2 denotes a cylinder, 3 denotes an injection screw, 4 denotes a hopper for supplying pellets of resin into the cylinder, and 5 and 6 denote a front plate and a rear plate, respectively, constituting an injection mechanism.

Guide bars 7 are provided between the front plate 5 and the rear plate 6 and a pressure plate 8 is arranged to be movable in forward and backward directions (right-hand and left-hand directions in the figure). A proximal portion of the screw 3 is rotatably attached to the pressure plate 8 and a driven pulley 12 is attached to the proximal portion and the screw is driven to rotate by a servomotor M1 for rotating the screw through a driving pulley 14, a timing belt 13 and the driven pulley 12. The screw rotation servomotor M1 is mounted on the pressure plate 8 and movable with the pressure plate 8 in the forward and backward directions. Further, a ball nut 10 is attached to the pressure plate 8 via a pressure sensor (load cell) 9 and a ball screw 11 is engaged with the ball nut 10 and the ball screw is driven to rotate by a servomotor M2 through a driving pulley 15, a timing belt 16 and a driven pulley 17. With this arrangement, the screw is moved in an axial direction thereof (right and left directions in the figure) through the pressure plate 8.

Figure 2:
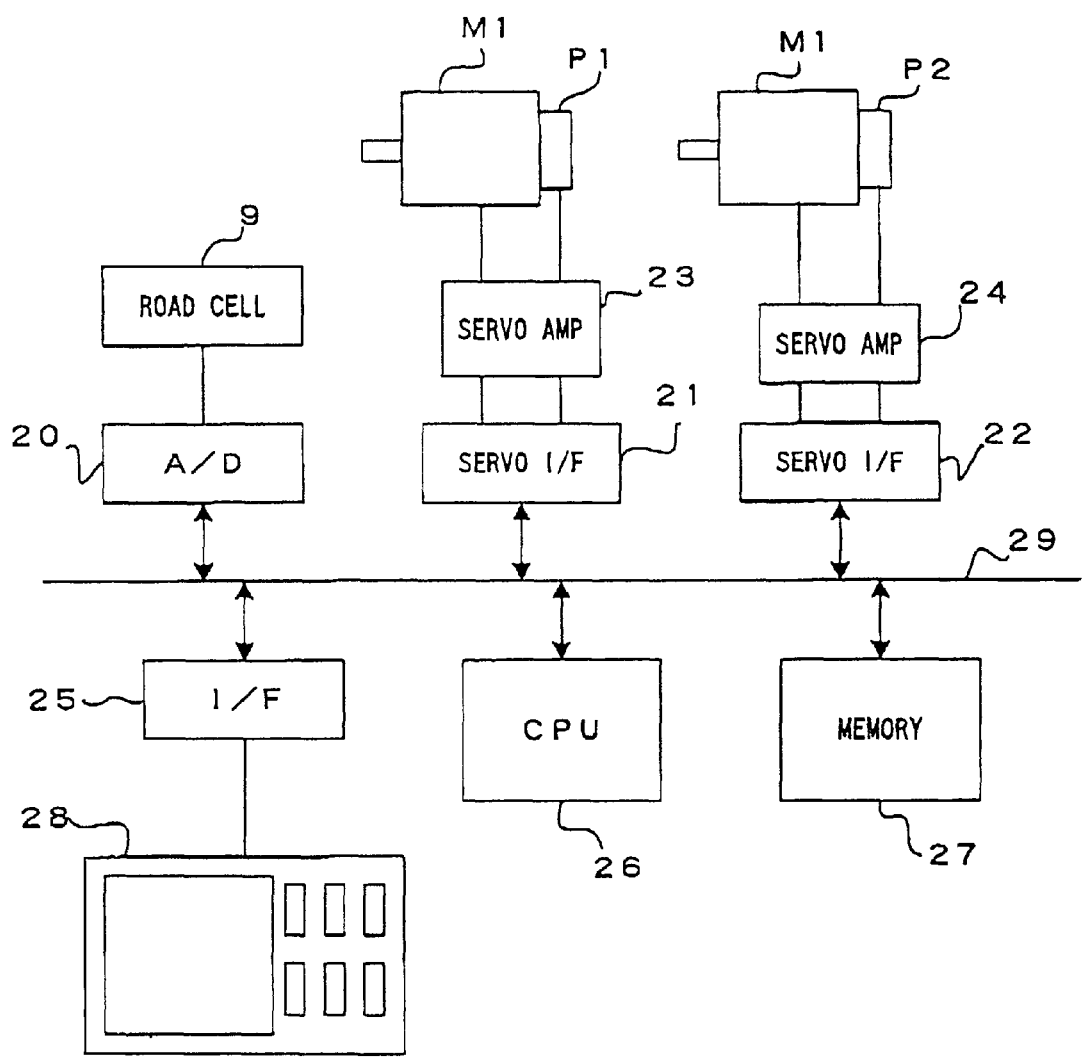
FIG. 2 is a block diagram of a principal part of a controller for controlling the injection molding machine as shown in FIG. 1.

FIG. 2 is a schematic block diagram of a controller for controlling the injection molding machine as shown in FIG. 1.

In FIG. 2, a reference numeral 26 denotes a processor for generally controlling the injection molding machine and connected with a A/D converter for converting analog signals to digital signals, servo interfaces 21, 22, input/output interface 25, a memory 27 in the form of ROM, RAM nonvolatile RAM, etc. through a bus 29. A pressure sensor (load cell) 9 is connected to the A/D converter and servo amplifiers 23 and 24 are connected to the servo interfaces 21 and 22, respectively.

A servomotor M1 and a pulse coder P1 as a speed detector are connected to the servo amplifier 23. Rotation speed of the screw 3 is detected based on the rotation speed of the servomotor M1 detected by the pulse coder P1. The servo amplifier 23 receives a speed command outputted from the processor 26 through the servo interface 21 and performs a feedback control of speed using a fed-back actual speed of the servomotor M1 (speed of the screw) and further performs a feedback control of electric current (torque) of the servomotor M1 to thereby drivingly control the motor.

A servomotor M2 and a pulse corder P2 as a position/speed detector are connected to the servo amplifier 24. An axial position and speed of the screw 3 in the cylinder 2 is detected based on rotational position and rotational speed of the servomotor M2 detected by the pulse coder P2. The servo amplifier 24 receives a position command or a speed command outputted from the processor 26 through the servo interface 22 and performs feedback control of position and/or speed using a fed-back actual position (position of the screw) and or a fed-back actual speed of the servomotor M2 (speed of the screw) and further performs feedback control of electric current (torque) of the servomotor M2 to thereby drivingly control the motor. The servo amplifiers 23 and 24 may be constituted by hardware such as electric circuits and may be constituted by a processor, ROM, RAM etc. to constitute a digital servo amplifier for performing controls of position, speed, torque etc. of the servomotor by software.

A data input device with a display of liquid crystal display or a CRT is connected to the input/output interface 25 and capable of setting various commands and various parameters and also indicating various set values, a screw rotation speed, screw retracted position and screw rotational torque, as described later.

With the above structure, the injection servomotor M2 is driven to rotate the ball screw 11 to move forward (in the lefthand direction in the figure) the ball nut 10 engaged with the ball screw 11 and the pressure plate 8, so that the screw 3 is moved forward to inject the molten resin in the cylinder 2 into a cavity of the mold 1 in the injection process.

In the metering process, the screw rotating servomotor M1 is driven to rotate the screw 3. The resin in the cylinder 2 is kneaded and melted by the rotation of the screw 3 and heat from the heaters 18. The kneaded and molten resin is fed forward to a vacant space in front of the screw 3 by a feeding function of the screw 3. Since a nozzle at the end of the cylinder is closed before injection of the resin, the fed resin is accumulated in the space formed in a front part of the cylinder 2. Pressure is produced in the space by the molten resin to generate a force for urging the screw in the backward direction. This pressure is detected by the pressure sensor (load cell) 9 and the injection servomotor M2 is controlled to be driven so that the detected pressure coincides with a predetermined back pressure to move the screw 3 in the backward direction.

Figure 5:
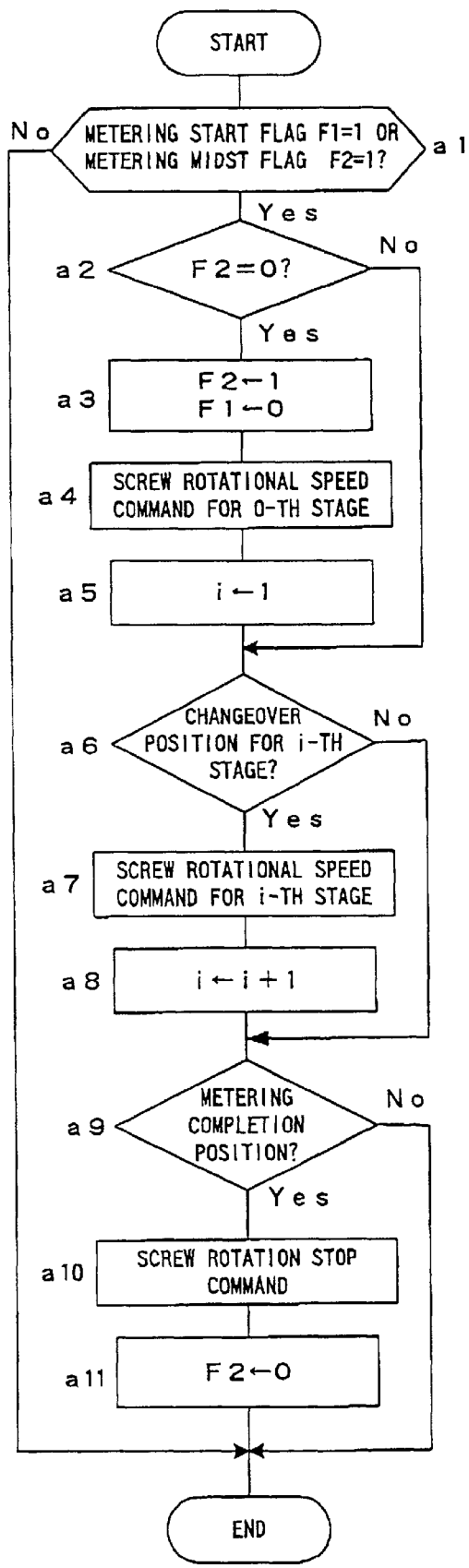
FIG. 5 is a flowchart of screw rotational speed control processing in the conventional metering process.

FIG. 4 shows an example of setting of screw rotational speed, changeover position of the screw rotational speed and metering completion position. FIG. 5 is a flowchart of the processing for controlling of the screw rotational speed to be executed by the processor 26 in the metering process according to the conventional art.

The metering process may be carried out in a single stage to drive the screw at a predetermined constant rotational speed without changing over the rotational speed. However, in general, a control in which the rotational speed of the screw is changed over in accordance with position of the screw 3 is performed. Further, the position of the screw is displayed with a distal end of the cylinder 2 as an origin and with a retracting direction of the screw as a positive direction. FIG. 4 shows an example of setting a screw rotational speed to N stages. The position of the changeover of the screw rotational speed, setting of screw rotational speed for respective stages and further metering completion position are set through the data input/output device 28 by changing the display to the metering condition setting frame.

In the conventional control of the screw rotational speed, the processor 26 executes the processing as shown in FIG. 5 for every predetermined period. First, it is determined whether or not either a metering start flag F1 which is set in a task other than this task is set to "1" or a flag F2 indicating midst of the metering is set to "1" (Step a1). If both flags are set to "0", the processing terminates without proceeding any further steps. When the metering process starts, the metering start flag F1 is set to "1" by the other task and the flag F1 of "1" is detected in Step a1, it is determined whether or not the metering process flag F2 is "0" (Step a2). If the flag F2 is "0", the flag F2 is set to "1" and the metering start flag F1 is reset to "0" (Step a3). The command of screw rotational speed set to 0-th stage at the metering start is outputted to servo amplifier 23 of the screw rotation servomotor M1 (Step a4). The servo amplifier 23 performs the speed feedback control based on the screw rotational speed command and the speed feedback signal from the pulse corder P1, to drivingly control the servomotor M1 to be rotate at the set rotational speed.

Then, the processor 26 sets the index i indicating the number of changeover stage to "1" (Step a5), determines whether or not the present position of the screw 3 which is obtained from the position feedback signal from the pulse corder P2 provided in the injection servomotor M2 is the changeover position of i-th stage (Step a6). If the present position does not reach the changeover position, it is determined whether or not the present position is the metering completion position (Step a9). If the present position is not the metering completion position, the processing of the present processing period terminates.

In the following processing period, since the metering flag F2 has been set to "1", the processing of Steps a1, a2, a6, a9 are successively executed and the processing are repeatedly executed until the present position reaches the changeover position of i-th stage. As described, the resin is molten by the rotation of the screw and the heat form the heater and the screw 3 is pushed backward by the pressure of the molten resin and this pressure is detected by the pressure sensor (load cell) 9, so that the injection servomotor M2 is controlled so that the detected pressure coincides with the set back pressure. The control of the back pressure by the injection servomotor M2 is well known in the art and therefore the detailed description is omitted. The back pressure is ordinarily changed over at every stage where the screw rotational speed is changed over.

When the present position of the screw 3 reaches the changeover position of i-th stage, the screw rotational speed is changed over to the command set for i-th setp and the index i is incrementally increased by "1" (Steps a7, a8). Then, it is determined whether or not the present position of the screw reaches the set metering completion position (Step a9) and if it is determined that the present position does not reach the metering completion position, the processing of the present period terminates. In the subsequent processing period, as described above, the rotational speed is changed over to the value for the stage every time when the screw position reaches the screw rotational speed changeover position of i-th stage. When the screw rotational speed is changed over to the set stage number N and the screw 3 is rotated at the set screw rotational speed for the stage N and it is determined that the screw 3 is reached to the set metering completion position, a screw rotation stop signal is outputted and the metering flag F2 is set to "0" (Step a10, a11). The rotation of the screw 3 is stopped by the screw rotation stop command and since the flags F1 and F2 are both "0", only the processing of Step a1 is executed in the subsequent processing periods and the screw rotational speed control of the metering process terminates.

The screw rotational speed control as described has been carried out conventionally. In this conventional method the screw rotational speed in each stage is kept constant by the speed feedback control and the back pressure is kept constant. Therefore, when amount of the resin supplied from the hopper 4 is made large, the screw rotation servomotor M1 produces a large torque to rotate at the constant set rotational speed, resulting in melting large amount of resin. Hence, pressure of the molten resin increases and retracting speed of the screw increases. In the contrary, when amount of supplied resin is small, the screw rotation servomotor M1 produces a small torque to keep the set rotational speed and amount of the molten resin is small. Consequently, the screw retracting speed decreases. Thus, when the supply amount of the resin is changed, the screw rotational speed is held to be the constant set value the retracting speed of the screw is dispersed and thus the metering time period is dispersed.

The present invention is to correct the dispersion of the metering time and also to obtain uniform kneading of resin. For these purposes, according to the present invention data of screw torque, screw retracting speed, screw retracting position in the metering process are collected as reference data by sampling and the screw rotational speed is controlled so that respective values coincides with the sampled reference data.

Figure 3:
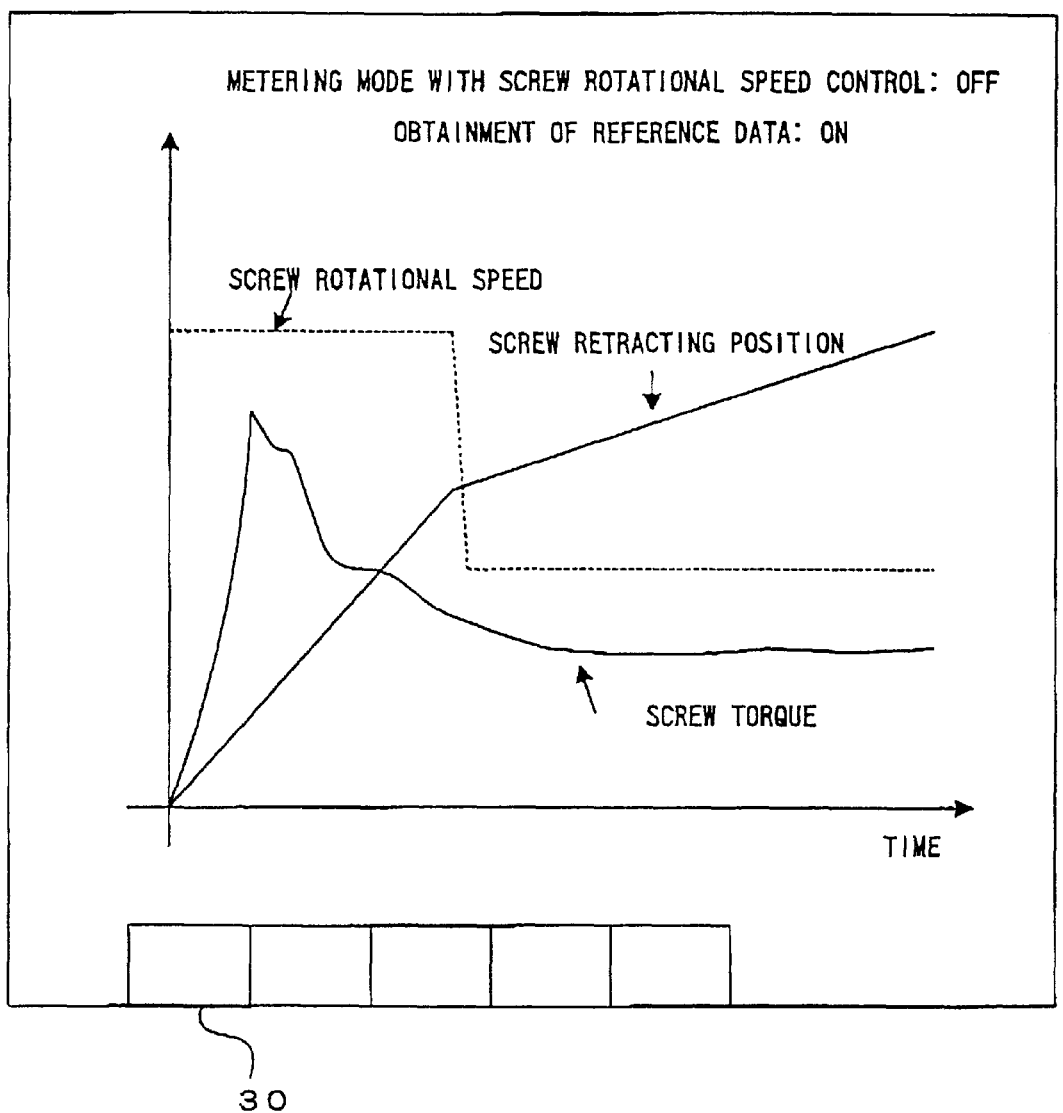
FIG. 3 is an example of an image on a display device for selecting a screw rotational-speed controlled metering mode and setting obtainment of reference data.
Figure 6:
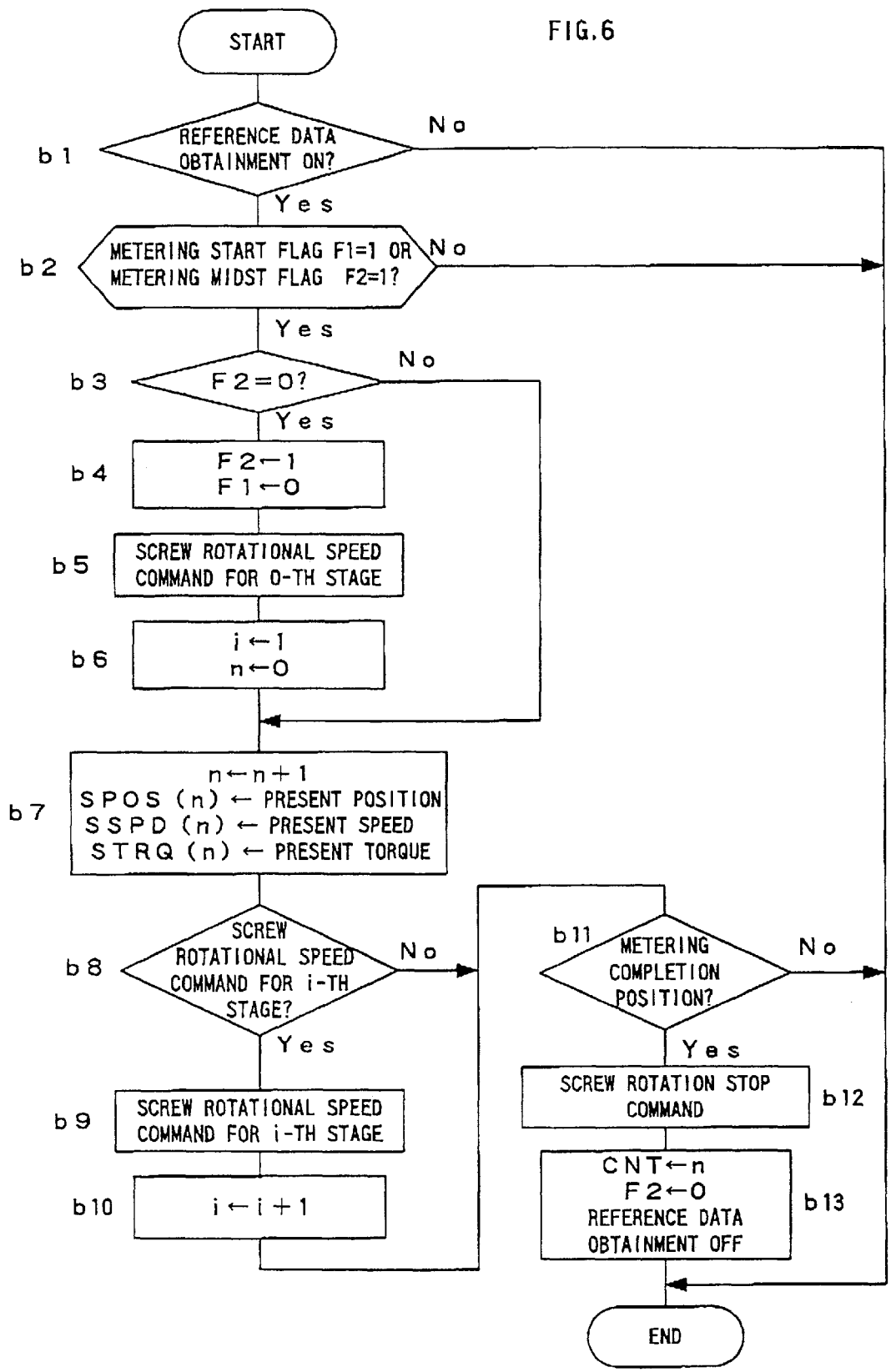
FIG. 6 is a flowchart of rotational speed control processing for reference data obtaining mode according to an embodiment of the present invention.

FIG. 3 shows an example of an image on the display device of the data input/output device 28 for selecting a metering mode with a screw rotational speed control and setting obtainment of reference data for use in this screw rotational speed control mode. When "screw rotational-speed controlled metering mode" is selected through a soft key 30, the screw rotational speed is controlled to coincide with the reference data stored in advance, as described later. Further, when "obtain reference data" is selected, in the subsequent metering process, the processing shown in FIG. 6 is executed to carry out sampling of data from a start of metering at every predetermined period. When the obtaining data is completed, "obtain reference mode" is automatically turned off. In the image shown in FIG. 3, horizontal axis represents time or position and the vertical axis represents the screw rotational speed, screw retracting speed, screw retracting position and screw rotational torque. With this arrangement, appropriate timing for turn the "screw rotational speed control metering mode" on is easily decided.

FIG. 6 is a flowchart of processing of screw rotation control in metering process when the obtaining reference data mode is turned on. The processing of FIG. 6 is different from the conventional processing of FIG. 5 in that the screw retracting position, screw retracting speed, rotational load torque exerted on the screw rotation servomotor M2 are detected and stored in the processing of FIG. 6. The screw retracing position and speed are obtained based on value of a present position resister and detected speed based on the feedback signal form the pulse corder P2 provided at the injection servomotor M2. Further, the load torque exerted on the screw rotation servomotor M1 may be detected based on the driving current flowing in the servomotor M1. However, in this embodiment, a disturbance load torque observer is incorporated in the servo amplifier 23 for drivingly controlling the screw rotation servomotor M1 and the load torque is precisely detected by the disturbance load torque observer. The arrangement and function of the disturbance torque observer is commonly known in the art and thus the detailed description thereof is omitted. The changeover of the screw rotational speed and setting of the changeover position is set as shown in FIG. 4.

In FIG. 6, the processor 26 determines whether or not the "obtaining reference data" is set ON (Step b1) and it is determined to set OFF the processing of Step b2 and the subsequent Steps are not executed and the processing of FIG. 6 terminates. In this case, the processing of FIG. 5 is ordinarily executed. When the "obtaining of reference data" is set ON, processing analogous to the processing of Steps a1 through a5 in FIG. 5 is executed. Thus, it is determined whether or not either a metering start flag F1 which is set in a task other than this task is set to "1" or a flag F2 indicating in metering is set to "1" (Step b2). If both flags are set to "0", the processing terminates without proceeding any further Steps. When the metering process starts, the metering start flag F1 is set to "1" by the other task and the flag F1 of "1" is set, it is determined whether or not the metering process flag F2 is "0" (Step b3). If the flag F2 is "0", the flag F2 is set to "1" and the metering start flag F1 is reset to "0" (Step b4). The command of screw rotational speed set to 0-th stage at the start of metering is outputted to servo amplifier 23 of the screw rotation servomotor M1 (Step b5). Then, the processor 26 sets the index i indicating the number of changeover stage to "1" and also sets an index n for obtaining sampling data to "0" (Step b6).

Then, the index n is incrementally increased by "1" and the screw position, present retracting speed of the screw and the screw rotational torque estimated by the disturbance load torque observer are read from the resister storing the present position of the injection servomotor M2, and stores in storing location for storing sampling data in the memory 27 as screw position SPOS(n), screw retracting speed SSPD(n) and a motor torque STRQ(n), respectively (Step b7). In this Step, in the case where one factor is selected for use as sampling data for correcting the screw rotational speed, data of only the selected one factor may be stored. In the case where one factor is selected for use in correction, it is necessary to store data of all the three factors.

Then, the processing of Step b8 and the subsequent Steps are executed. The processing of Steps b8 through b13 are the same as that of Steps a6 through all in FIG. 5 and therefore the detailed description thereof is omitted. The processing of Step b8 and the subsequent Steps is different form the processing of Steps a6 through a11 in FIG. 5 in that the metering flag F2 is set to "0" and "obtaining of reference data" is turned OFF in Step b13 corresponding Step a11 in FIG. 5.

In the metering process after the "obtaining of reference data" is set ON, the screw rotational speed is changed over every time when the screw reaches the set screw rotational speed changeover position to carry out the metering process. Also, the screw position SPOS(n), the screw retracting speed SSPD(n) and the motor torque STRQ(n) are collected and stored as sampling data in every sampling period of the processing period of this screw rotational speed control. Thus, in the processing of FIG. 6 the obtaining of sampling data is added to the processing shown in FIG. 5.

Hereinafter, metering control processing in which the screw rotational speed is corrected in a metering process using the obtained sampling data will be described.

First, the screw rotational speed control processing in which the screw rotational speed is corrected base on the screw rotational torque according to a first embodiment of the present invention will be described referring to FIGS. 7 and 8.

It is premised that the sampling data of the screw rotational torque have been obtained and stored in the memory 27 as reference data by the above described processing of FIG. 6. When the "screw rotational control metering mode" is set ON, the processor 26 executes the task processing as shown in FIG. 7. The processing as shown in FIG. 7 differs from the conventional processing of the screw rotational speed control in the metering process in that Step c9 of correcting a screw rotational speed command is added and the index i is set to "1" at the first processing period in the metering process and the index n for correction of the screw rotational speed command is set to "1".

The processor 26 determines whether or not either the metering start flag F1 which is set in a task other than this task is set to "1" or the flag F2 indicating midst of metering is set to "1" (Step c1). If both flags are set to "0", the processing terminates without proceeding any further Steps. When the metering process starts, the metering start flag F1 is set to "1" by the other task and the flag F1 of "1" is detected in Step c1, it is determined whether or not the metering midst flag F2 is "0" (Step c2). If the flag F2 is "0", the flag F2 is set to "1" and the metering start flag F1 is reset to "0" (Step c3). The command of screw rotational speed which is set to 0-th stage at the metering start is stored in the resister as the screw rotational speed SRCMD in this processing period (Step c4). In the conventional screw rotational speed control as shown in FIG. 5, this command of screw rotational speed is utputted to the servo amplifier 23 of the screw rotation servomotor M1. The processing for screw rotational speed control shown in FIG. 7 differs from the conventional control processing in this respect.

Then, the processor 26 sets the index i indicating the number of changeover stage to "1" and the index n for specifying sampling data to "0" (Step c5). It is determined whether or not the present position of the screw 3 which is obtained from the position feedback signal from the pulse corder P2 provided in the injection servomotor M2 is the changeover position of i-th stage (Step c6). If the present position of the screw 3 has not reached the changeover position, the correction processing of the screw rotational speed command is started (Step c9). Details of the correction processing of the screw rotational speed command is shown in FIG. 8. First, it is determined whether or not the index n exceeds the total number of the sampling data indicated by value of the counter CNT (Step c9). If the index n does not exceed the total number, the index n is incrementally increased by "1" and the present value of the screw torque, which is estimated by the disturbance torque estimating observer (or obtained based on the driving current of the screw rotation servomotor), from the value of the sampling data STRQ(n) of the screw rotational torque indicated by the index n for the reference data stored in the memory, to obtain deviation ΔTRQ (Step c92). Then, the deviation ΔTRQ is multiplied by a set constant K (positive value) to obtain a correction amount SROT for the screw rotational speed command (Step c93). Further, in his embodiment, in order to prevent that the screw rotational amount is excessively changed by the excessive correction amount SROT, the correction amount SROT is clamped to ±10% of the present screw rotational speed (Step c94). Thus obtained correction amount of the screw rotational speed command is added to the screw rotational speed command SRCMD stored in the register to renew the screw rotational speed command SRCMD to the corrected value (Step c95). Further, the corrected screw rotational speed command SRCMD is clamped to the set maximum value if the command exceeds the set maximum value (Step c96). Thus corrected screw rotational speed command SRCMD is outputted to servo amplifier 23 of the screw rotation servomotor M1 (Step c97). The servo amplifier 23 performs the speed feedback control based on the screw rotational speed command and the speed feedback signal from the pulse corder P1, to drivingly control the servomotor M1 so that the screw 3 is rotated at the commanded rotational speed.

Then, the procedure returns to the main routine and it is determined whether or not the present screw position reaches the metering completion position (Step c10) and if the screw position does not reach the metering completion position, the processing of this period terminates.

In the subsequent processing period, since the metering midst flag F2 is set to "1", the processing of Steps c1, c2, c6, c9 (c90 through c97) and c10 is executed to successively output the corrected screw rotational speed command.

The processing of Steps c1, c2, c6, c9 (c90 through c97) and c10 is repeatedly executed until it is determined that the screw 3 retracts the changeover position of i-th stage. As described, the resin in the cylinder 2 is molten by the rotation of the screw and the heat form the heater 18 and the screw 3 is urged backward by the pressure of the molten resin and this pressure is detected by the pressure sensor (load cell) 9, so that the injection servomotor M2 is controlled so that the detected pressure coincides with the set back pressure. Details of the control of the back pressure by the injection servomotor M2 is omitted. The back pressure is ordinarily changed over at every stage where the screw rotational speed is changed over.

When it is determined that the position of the screw 3 reaches the changeover position of i-th stage, the screw rotational speed command is changed over to the value set for i-th stage and the index i is incrementally increased by "1" (Steps c7, c8). Then, the processing of the screw rotational speed command correction of Steps c90–c97 is executed to output the corrected screw rotational speed command (Step c92) and it is determined whether or not the present position of the screw reaches the set metering completion position (Step c10). If it is determined that the present position does not reach the metering completion position, the processing of the present period terminates. In the subsequent processing periods, the rotational speed is changed over to the set value for i-th stage every time when the screw position reaches the screw rotational speed changeover position of the i-th stage, as described above.

Thus, the screw rotational speed is changed over up to the set N-th stage and the screw 3 is rotated by correcting the set screw rotational speed for the N-th stage, and if the index n exceeds the total number of the reference data stored in the counter CNT, the deviation ΔTRQ is set to "0" (Step c91) and the processing proceeds to Step c93. In Step c93, the correction amount SROT for the screw rotational speed command is made "0" to keep the screw rotational speed command at the set rotational speed.

In the screw rotation control at the N-th stage, when it is determined that the screw 3 is reached to the set metering completion position in Step c10, a screw rotation stop signal is outputted and the metering midst flag F2 is set to "0" (Step c11, c12). The rotation of the screw 3 is stopped by the screw rotation stop command and since the flags F1 and F2 are both "0", only the processing of Step c1 is executed in the subsequent processing periods and the screw rotational speed control of the metering process terminates.

As described above, in this embodiment, in controlling the screw rotational speed based on the screw rotational speed for the respective metering stages defined by the screw rotational speed changeover positions, the screw rotational torque is sampled to obtain and store the reference data. The screw rotational speed control metering mode is turned on, the screw rotation servomotor M1 is drivingly controlled based on the same set screw rotational speed command pattern (a plurality of metering stages having changeover positions) as that in sampling the reference data and also the screw rotational speed command is corrected by the correction amount obtained by deviation between the present screw torque and the sampling data of the screw torque from the beginning of the metering stored as the reference data. With this arrangement, the screw rotational speed command is corrected so that the screw torque coincides with the screw torque when the reference data are obtained. This results in that the metering time is controlled to coincides with that in obtaining the reference data.

Specifically, when the screw rotates at the set rotational speed, if the detected screw torque is smaller than the reference data, the screw rotates by the torque smaller than that in obtaining the reference data at the set rotational speed and this means that the supply amount of resin is small. If the supply amount of resin is small, the retracting speed of the screw lowers. In this embodiment, the correction amount for screw rotational speed command is obtained based on the deviation between the present screw torque and the screw torque of the reference data, and the correction amount is added to the screw rotational speed command to increase the screw rotational speed and also increasing the supply amount of resin, the screw torque and also the screw retracting speed increase.

Contrary, in the case where the detected screw torque is greater than the reference data, the screw rotates by the torque greater than that in obtaining the reference data because of large supply amount of resin, and this means the screw retracting speed is increased. The screw rotational speed command is corrected based on the correction amount based on the deviation between the present screw torque and the screw torque of the reference data to reduce the screw rotational speed. The deviation of negative value is obtained because the present torque is greater than that of the reference data and thus the correction amount is rendered negative, resulting in reduction of the screw rotational speed command. Reduction of the screw rotational speed causes reduction of supply amount of resin and thus the screw retracting speed is reduced.

As a result, the screw retracting speed is controlled to be coincides with that in obtaining the reference data and therefore deviation of metering time decreases to be substantially constant.

In the above description, it is assumed that the screw position at start of metering is always constant and therefore the screw position in obtaining the reference data coincides with the screw position in each metering process. However, a cushion amount left in the cylinder when completion of each injection process is dispersed occasionally and therefore the screw position at the start of metering process. The changeover of the screw rotational speed is carried out based on the present screw position whilst the correction amount is obtained based on the elapsed time form the start of the metering process, i.e., the number of the sampling periods from the start of the metering process. Therefore, it is no significant problem when the reference data and the detected screw torque is based at the same stage of metering in which the same screw rotational speed command is set. When the stage is changed over, it may occur that the set screw rotational speed for the reference data and the set screw rotational speed for the present metering process are different form each other. For example, in the case where the screw position at the start of the present metering process is retracted form the screw position at the start of the metering process in obtaining the reference data (when the cushion amount is greater than that in obtaining the reference data), the distance between the start position and the 1-st changeover position in the metering process in obtaining the reference data is longer than that in the present metering process. Thus, the time period in which the screw is rotated based on the screw rotational speed command set for 0-th stage in the metering process in obtaining the reference data is longer than that in respective metering process, and the number of the sampling data in the 0-th stage are larger than that in the present metering process. As a result, the screw rotational speed command is changed over form 0-th stage to 1-st stage in the practical metering process whilst the rotational speed command is not yet changed over from 0-th stage to 1-st stage even in the same sampling period processing period) from the start of the metering process. Namely, the screw torque STRQ(n) of the reference data has been obtained when the screw rotational speed command is set for the 0-th stage, whereas the present value of the screw rotational speed is detected when the screw rotational speed is set for the 1-st stage in Step c92. In the case where the screw rotational speed set for 1-st stage is higher than that set for 0-th stage, the screw torque detected in the present processing period is greater than the screw torque STRQ(n) of the reference data in the above described example since the screw rotational torque is made greater when the rotational speed is higher. In this case, the deviation ΔTRQ of negative value is obtained and accordingly the correction amount SROT of negative value is obtained. Thus, the set screw rotational speed presently set for 1-st stage is corrected to be the screw rotational speed smaller than the set rotational speed for 1-st stage.

The dispersion range of the cushion amount, however, is small such that it corresponds a distance which the screw moves for several sampling periods (processing periods). Therefore, the above-mentioned decrease of the screw rotational speed occurs only in several sampling periods (processing periods) when the screw rotational speed is changed over. This phenomenon occurs to abate a sharp change of the screw rotational speed in changing over thereof and to make the melting and kneading of resin uniform and thus raising no significant problem. Also, there occurs a case where the value of the counter CNT storing total number of the sampling periods is different from the total number of the processing periods until the completion of the metering process because of the dispersion of the cushion amount. In order to deal with such case, ΔTRQ is made "0" at Step c91 not to correct the screw rotational speed command in the case where the index n exceeds the value of the counter CNT storing the number of the processing periods in the present metering process. Further, the correction of the screw rotational speed is carried out until the metering process is completed if the screw reaches the metering completion position before the value of the index n exceeds the value of the counter CNT.

Figure 9:
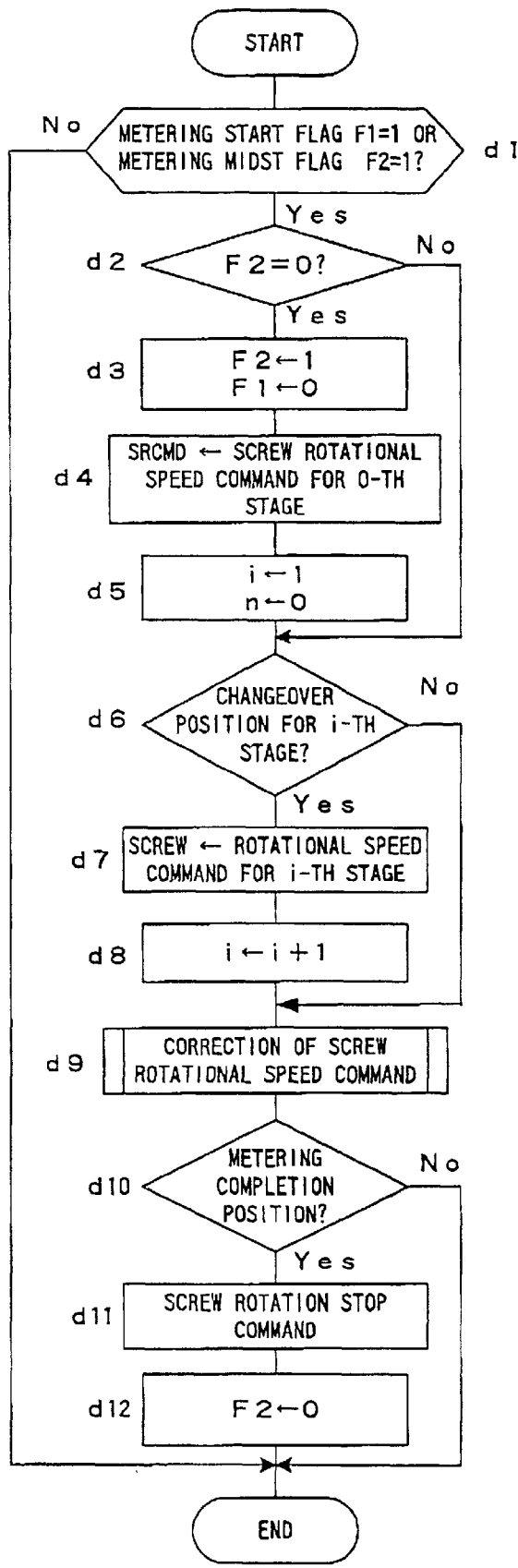
FIG. 9 is a flowchart of main-routine processing in which the screw rotational speed is corrected in accordance with the screw retracting speed according to a second embodiment of the invention.
Figure 10:
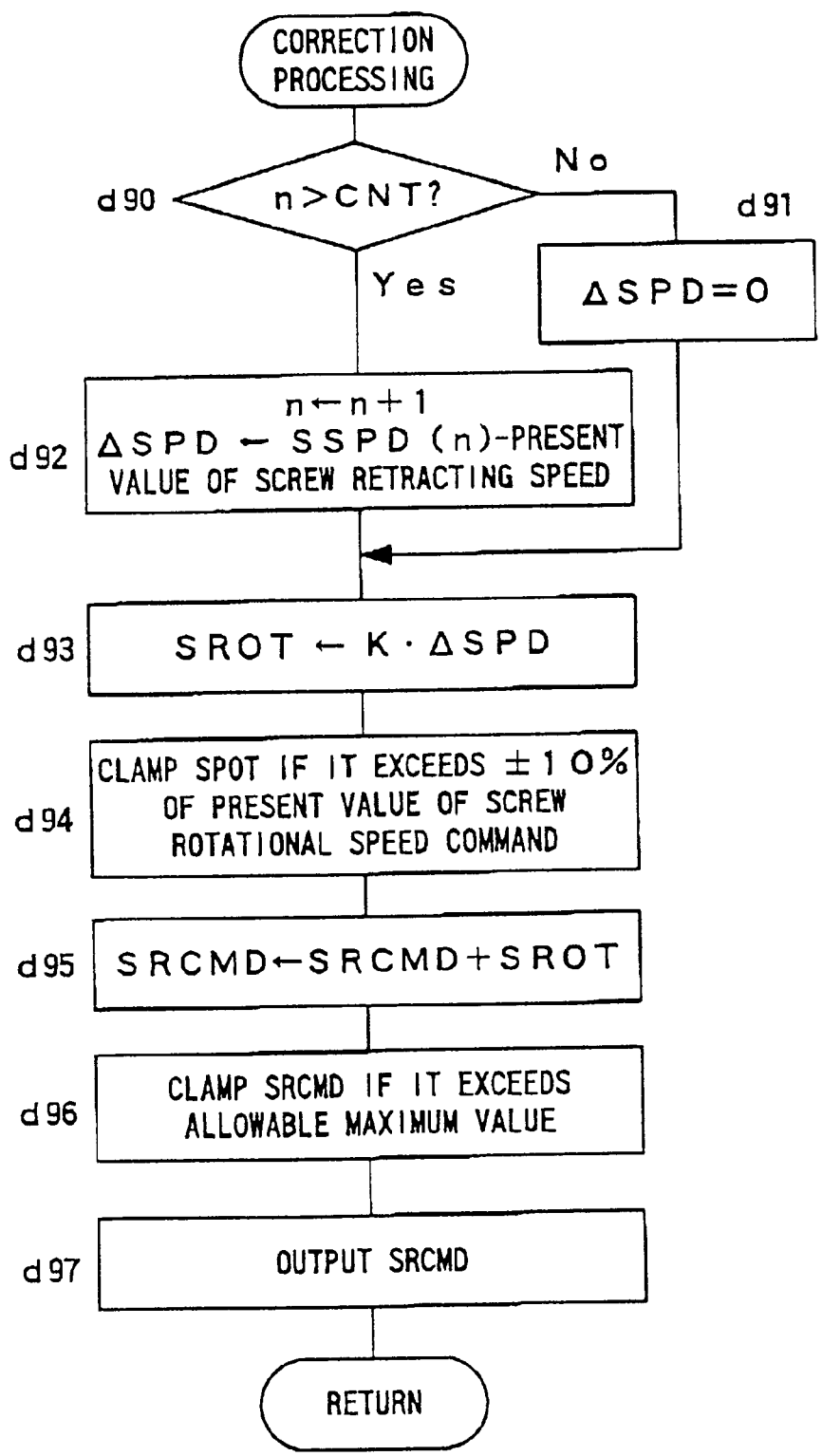
FIG. 10 is a flowchart of correction processing of the screw rotational speed command in the second embodiment.

FIGS. 9 and 10 are flowcharts showing screw rotational speed control processing according to a second embodiment of the present invention, in which screw retracting speed is stored as reference data and screw rotational speed command is corrected so that the screw retracting speed coincides with the reference data.

Figure 7:
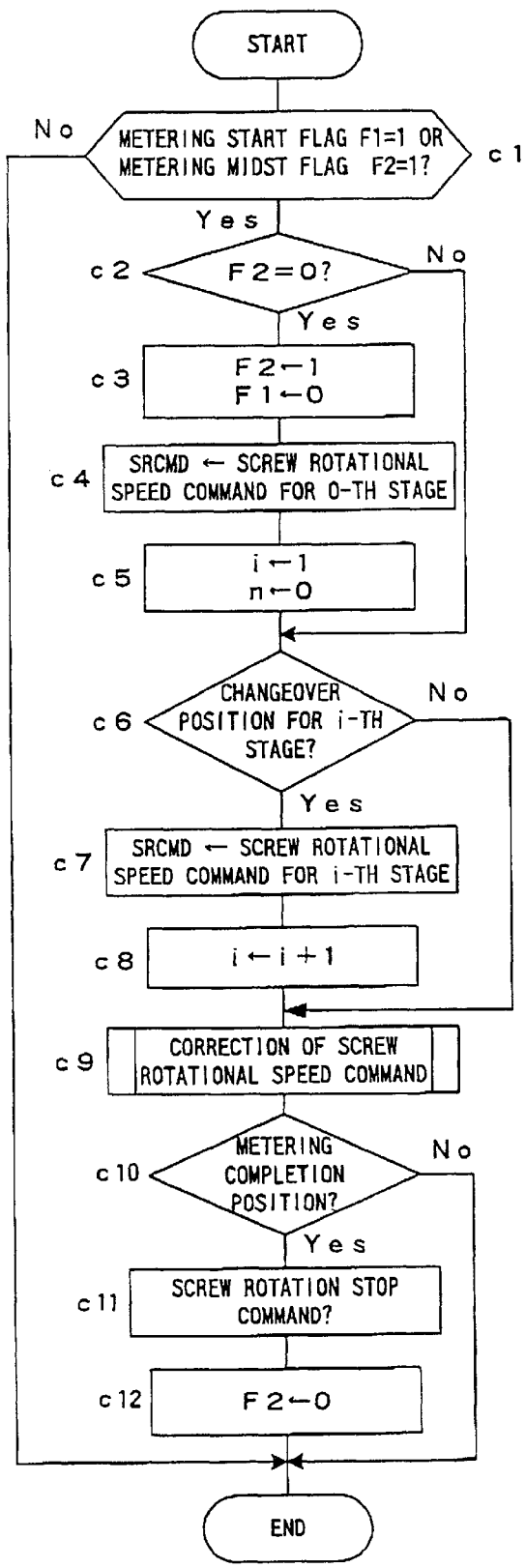
FIG. 7 is a flowchart of a main routine of processing for correcting rotational speed command for screw based on the screw rotational torque according to a first embodiment of the invention.
Figure 8:
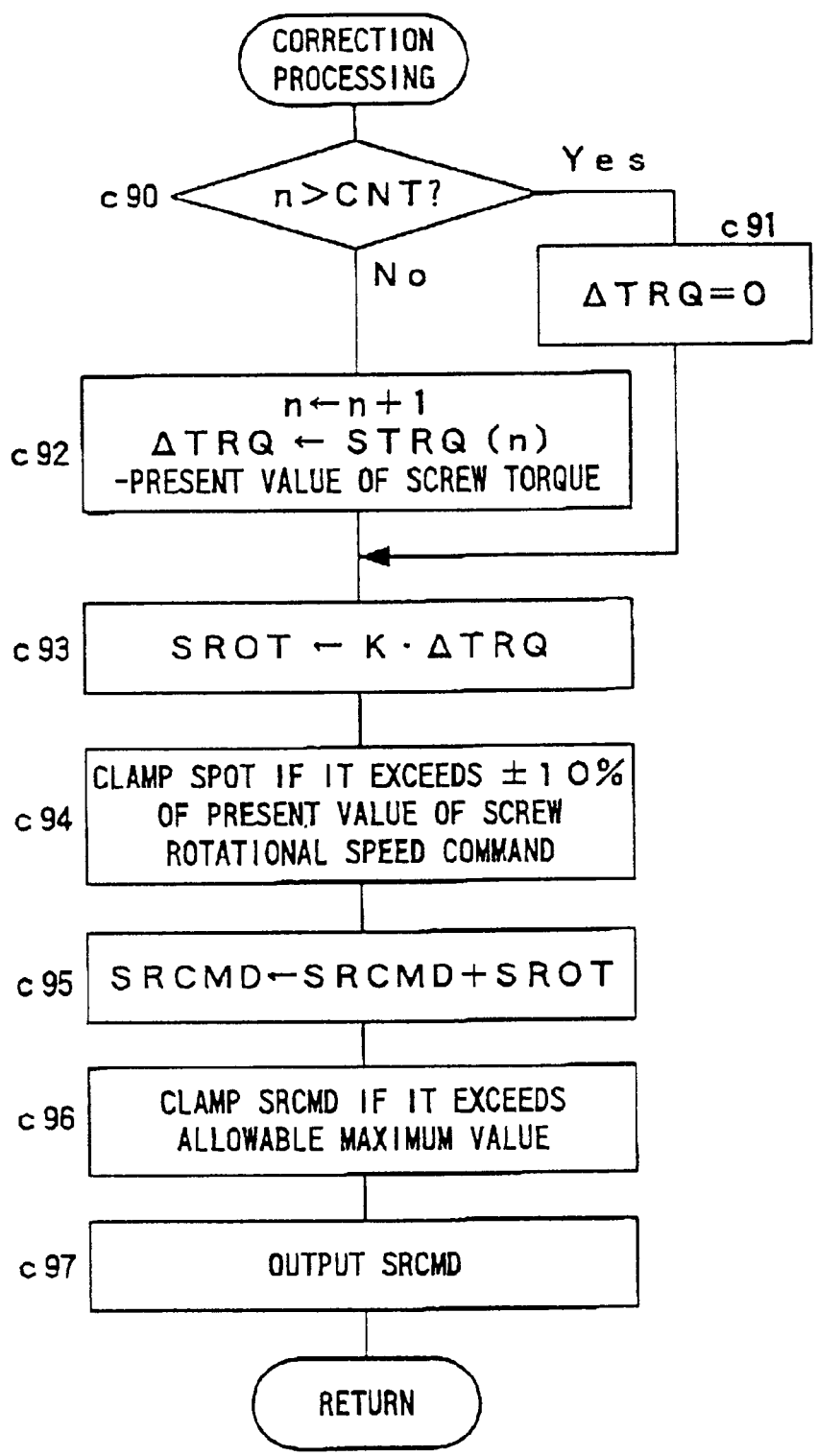
FIG. 8 is a flowchart of correction processing of the screw rotational speed command in the flowchart shown in FIG. 7.

A main routine processing shown in FIG. 9 is the same as the main routine processing in FIG. 7 and a sub routine processing of Step d9 which is shown in FIG. 10 in detail is different form the sub routine processing of Step c9 which is shown in FIG. 8 in detail.

When the metering process is started, a screw rotational speed set for the present stage is stored in a resistor as a screw rotational speed command SRCM every time when the screw reaches each changeover position for each stage. The screw rotational speed command SRCMD is corrected in the processing shown in FIG. 10 and outputted. Since the processing shown in FIG. 9 is the same as that shown in FIG. 7, the description thereof is omitted here and details of the processing of FIG. 10 will be described.

When the procedure enters the screw rotational speed command correction processing of Step d9 in FIG. 9, the processor 26 determines whether or not the index n is greater than the total number of the sampling data indicated by value of the counter CNT (Step c90). If the index n does not exceed the total number, the index n is incrementally increased by "1" and the present value of the screw retracting speed, which is detected by the pulse coder P2, from the value of the reference sampling data SSPD(n) of the screw retracting speed stored in the memory 27, to obtain deviation ΔSPD (Step d92). Then, the deviation ΔSPD is multiplied by a set constant K (positive value) to obtain a correction amount SROT for the screw rotational speed command (Step d93). Further, in order to prevent that change of the screw rotational speed is excessive, the correction amount SROT is clamped to ±10% of the present screw rotational speed (Step d94). Thus obtained correction amount of the screw rotational speed command is added to the screw rotational speed command SRCMD stored in the register to renew the screw rotational speed command SRCMD to the corrected value (Step d95). Further, the corrected screw rotational speed command SRCMD is clamped to an allowable maximum value if the command exceeds the maximum value (Step d96). Thus corrected screw rotational speed command SRCMD is outputted to the servo amplifier 23 of the screw rotation servomotor M1 through the servo interface 21 (Step d97). The servo amplifier 23 performs the speed feedback control based on the screw rotational speed command SRCMD and the speed feedback signal from the pulse corder P1, to drivingly control the servomotor M1 so that the screw 3 is rotated at the commanded rotational speed.

If the index n exceeds the total number of the reference data stored in the counter CNT in Step d90, the deviation ΔSPD is set to "0" (Step d91). Thus, the screw rotational speed command SRCMD is not corrected and the set screw rotational speed is outputted as the screw rotational speed command.

Subsequently, the screw rotational speed command preset for respective stage is corrected and outputted so that the screw retracting speed in the metering process coincides with the screw retracting speed stored as reference data until it is determined that the present screw position reaches the set metering completion position in Step d10. When the screw retracing position reaches the metering completion position, rotation of the screw 3 is stopped and the metering midst flag F2 is set to "0" (Steps d11, d12) to terminate the screw rotational speed control processing in the metering process.

In this second embodiment, the deviation ΔSPD between the present screw retracting speed and the corresponding screw retracting speed of the reference data from the start of the metering, and the screw rotational speed command is corrected based on the deviation ΔSPD so that the screw retracting speed coincides with the screw retracting speed pattern in the reference data. With the above arrangement, time required for the metering process is made constant. In the case where the present screw retracing speed is lower than the reference screw retracting speed and thus the deviation ΔSPD is of positive value, the correction amount SROT of positive value is obtained at Step d9 and the screw rotational speed is increased by the positive correction amount SROT to increase rotating speed of the screw 3. As a result, supply amount of resin is increased to increase pressure of the molten resin so that the retracting speed of the screw increases to coincides with that in obtaining the reference data. Contrary to the above, in the case where the present screw retracing speed is higher than the reference screw retracting speed and thus the deviation ΔSPD of negative value is obtained in Step d92, the correction amount SROT of negative value is obtained at Step d93 and the screw rotational speed command is decreased by the negative correction amount SROT to decrease the rotating speed of the screw 3, resulting in that the retracting speed of the screw coincides with that in obtaining the reference data.

In this second embodiment, influence of dispersion of the cushion amount appears in the vicinity of the changeover positions of the screw rotational speed to raise a problem similar to that in the first embodiment. In this case also, the influence of dispersion of the cushion amount abates a sharp change of the screw rotational speed and appears for only several processing periods, thereby raising no significant problem.

Figure 11:
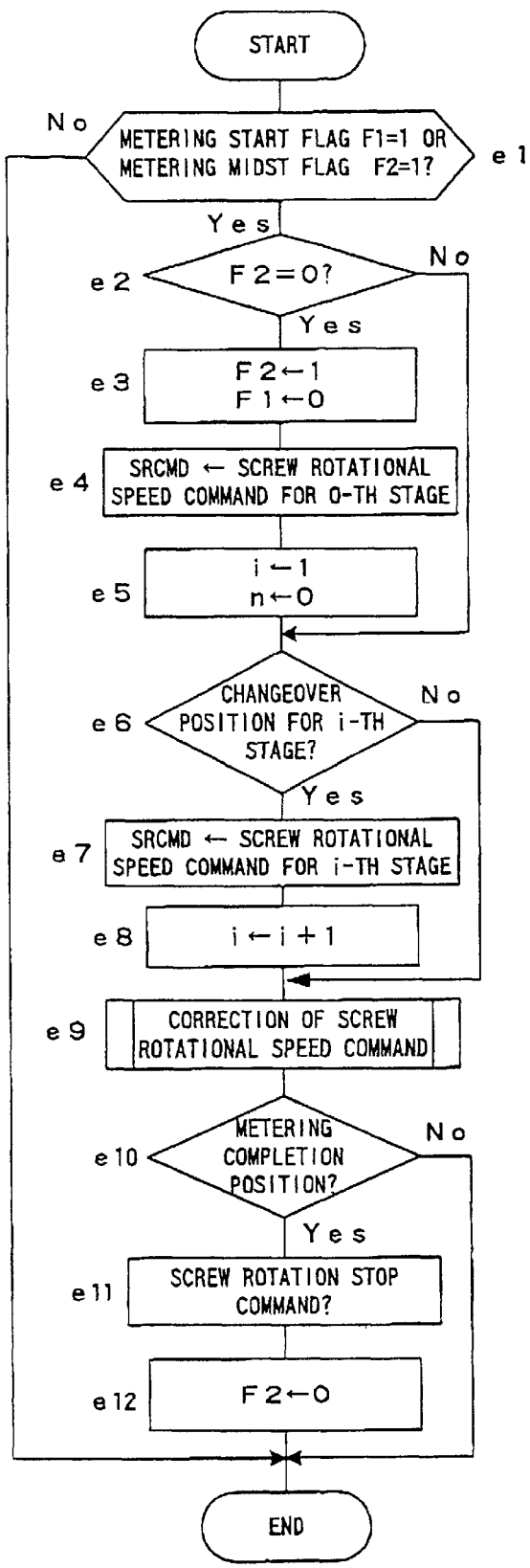
FIG. 11 is a flowchart of main-routine processing in which the screw rotational speed is corrected in accordance with the screw retracting position according to a third embodiment of the invention.
Figure 12:
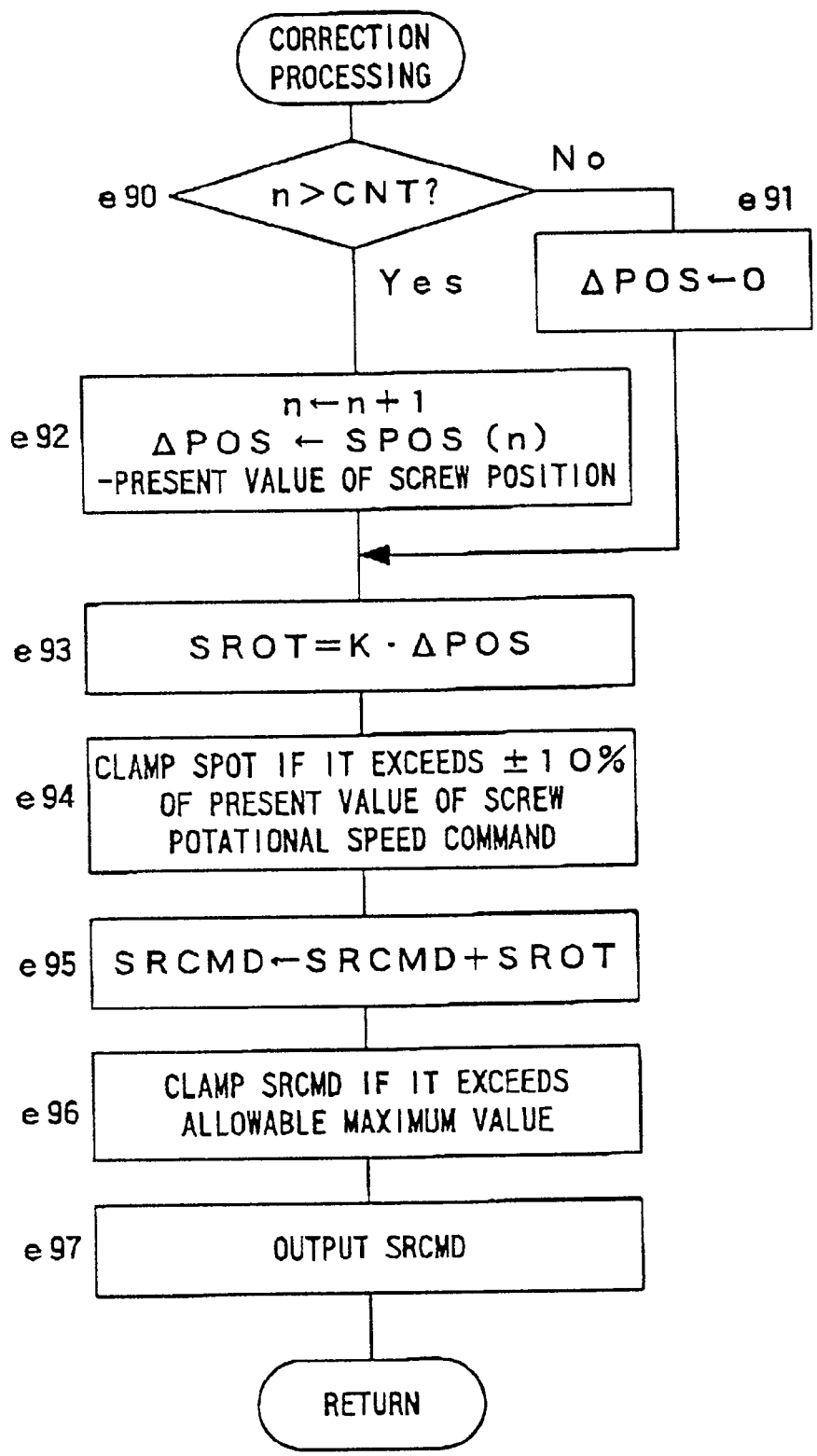
FIG. 12 is a flowchart of correction processing of the screw rotational speed command in the third embodiment.

FIGS. 11 and 12 are flowcharts showing screw rotational speed control processing according to a third embodiment of the present invention, in which screw retracting position is stored as reference data and screw rotational speed command is corrected so that the screw retracting position coincides with the reference screw position.

A main routine processing shown in FIG. 11 is the same as the main routine processing in FIGS. 7 and 9, and a sub routine processing of Step e9 in FIG. 11, which is shown in FIG. 12 in detail, is different form the sub routine processing of Steps c9 and d9 in FIGS. 7 and 9, which are shown in FIGS. 8 and 10 in detail. Since the processing shown in FIG. 11 is the same as that shown in FIGS. 7 and 9, the description thereof is omitted here.

The processing for correcting the screw rotational speed command as shown in FIG. 12 differs from the processing shown in FIGS. 8 and 10 only in processing of Steps e92 and e93.

In this third embodiment, the present value of the screw retracting position, which is detected by the pulse coder P2 at the present n-th processing period, from the value of the reference sampled data SPOS(n) of the screw retracting position of the n-th sampling period corresponding to this n-th processing period of the screw rotational speed control processing, to obtain position deviation ΔPOS (Step e92). Then, the deviation ΔPOS is multiplied by a set constant K (positive value) to obtain a correction amount SROT for the screw rotational speed command (Step e93).

In the third embodiment, the screw rotational speed is corrected to eliminate the deviation between the present screw retracting position and the reference screw retracting position, so that transition pattern of the screw position in time series from the start of the metering coincides with the transition pattern of the screw position by the reference data.

In the case where the present screw position is behind the reference screw position and thus the deviation ΔPOS of positive value is obtained, the correction amount SROT of positive value is obtained at Step e92 and the screw rotational speed is increased by the positive correction amount SROT to increase the rotational speed of the screw 3. As a result, supply amount of resin is increased to increase pressure of the molten resin so that the retracting speed of the screw increases to recover the delay of the screw retracting motion. Contrary to the above, in the case where the present screw position is advanced than the reference screw position and thus the position deviation ΔPOS of negative value is obtained in Step d92, the correction amount SROT of negative value is obtained at Step d93 and the screw rotational speed command is decreased, so that the screw 3 rotates slowly than the set rotational speed, resulting in that the retracting speed of the screw decreases to compensate the advancement.

As described, the screw rotational speed is controlled so that the transition pattern of the screw position coincides with the transition pattern of the reference screw position in time series from the start of the metering, to render the metering time constant.

In the third embodiment, the influence of the dispersion of the cushion amount appears immediately after the start of metering on the correction of the screw rotational speed command. When the cushion amount in the metering process when obtaining the reference data is different from that in the present metering process, the position deviation ΔPOS appears in Step e12. For example, in the case where the cushion amount in obtaining the reference data is smaller than that in the actual metering process, the position deviation ΔPOS is made negative and thus the correction amount SROT is of negative value. Reduction of the screw rotational speed causes reduction of the screw retracting speed and it takes longer time to reach the 1-st changeover position of the screw rotational speed, so that the number of the processing periods for 0-th stage approaches the number of the sampling periods of the reference data. This phenomenon continues until the number of the processing periods coincides with the number of the sampling periods of the reference data, and when both meet with each other, the position deviation ΔPOS is made "0" at Step e92 to null the correction of the screw rotational speed command due to the difference of the cushion amounts.

In the forgoing embodiments, the reference data are obtained as a function of time elapsed form the start of the metering. Namely, the reference data are obtained by sampling the values at every predetermined period from the start of the metering in time series. The correction amount for the screw rotational speed command is obtained based on the deviation between the sampling data of the reference data and the sampling data in respective metering process.

Instead of using the sampling data in time series, the sampling data on the basis of the absolute screw position from the origin. In the third embodiment, the screw position is used as the sampling data, the sampling data (screw torque and screw retracting speed) on the basis of the screw position is applied to the first and second embodiments.

The processing for obtaining the reference data is the same as that shown in FIG. 6, provided that the screw present position SPOS(n) has to be obtained in Step b7.

Figure 13:
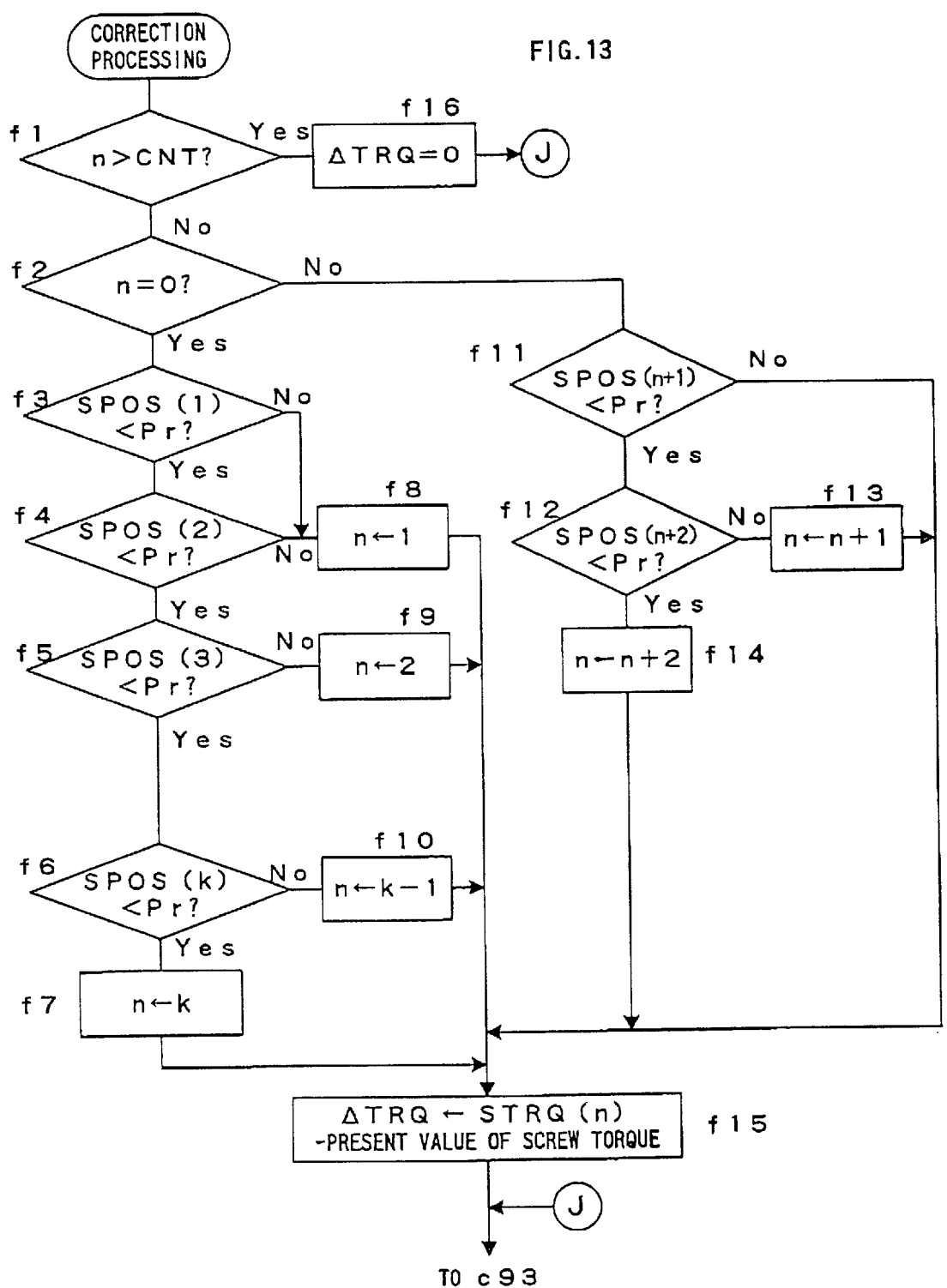
FIG. 13 is a flowchart of correction processing of the screw rotational speed command in accordance with the screw torque on the basis of the screw position.

FIG. 13 is a flowchart of processing for correcting the screw rotational speed command in accordance with the screw torque on the basis of the screw position.

When the processing of correcting the screw rotational speed command at Step c9 in FIG.9, the processor 26 determines whether or not the index n exceeds the value of the counter CNT (Step f1) and if the index n does not exceed the value of the counter CNT, it is determined whether the index n is "0" or not, i.e. whether or not the present processing is in the first processing period (Step f2). If the index n is "0", it is determined whether or not the screw present position Pr is greater than the 1-st screw position SPOS(1) stored as the reference data (Step f3). If the screw present position Pr is not greater than the 1-st screw position SPOS(1), i. e., the cushion amount in this metering process is smaller than or equal to the cushion amount in obtaining the reference data, the index n is set to "1" (Step f8). If the present position Pr is greater than the 1-st position SPOS(1) and not greater than the 2-nd position SPOS(2), the index n is set to "1" (Steps f4, f8). If the present position Pr is greater than the 2-nd position SPOS(2) and not greater than the 3-rd position SPOS(3), the index n is set to "2" (Steps f5, f9). Subsequently, if the present position Pr is greater than the i-th position SPOS(i) and not greater than the (i+1)-th position SPOS(i+1), the index n is set to "i". These determinations are performed until the k-th screw position SPOS (k) and if the present position Pr is greater than the k-th screw position SPOS(k), the index n is set to "k" (Step f7). The value of "k" is predetermined based on the allowable cushion amount and set slightly smaller than the cushion amount at which the molding will be defective because of excessive cushion amount.

At the start of the actual metering, the screw position may be different from the screw position in obtaining the reference data because of the dispersion of the cushion amount. In this embodiment, if the screw position Pr sampled at the first processing period is greater than the i-th position SPOS(i) and not greater than the (i+1)-th position SPOS(i+1) sampled as the reference data, the index n is set to "i". If the screw position Pr is smaller than or equal to the first position SPOS(0) of the reference data, the index n is set to "1".

Thus, after setting the value of the index n, the present screw torque is subtracted from the screw torque STRQ(n) of the reference data to obtain the deviation ΔTRQ (Step f15). The processing of Step c95 and the subsequent Steps in FIG. 8 is performed to correct the screw rotational speed and output the corrected command.

In the next processing period, as the index n is not "0", the procedure proceed to form Step f2 to Step f11 where it is determined whether or not the screw position Pr is greater than the screw position SPOS(n+1) of the reference data and then whether or not the screw position Pr is greater than SPOS(n+2) (Step f12). If the screw position Pr does not exceed the screw position SPOS(n+1), the index n is not changed and if the screw position Pr is between the screw positions SPOS(n+1) and SPOS(n+2), the index n is incrementally increased by "1" (Step f13). If the screw position Pr exceeds the screw position SPOS(n+2), the index n is incrementally increased by "2" (Step f14) and the procedure proceeds to Step f15. Thus, it is determined whether the screw position Pr is before the section from SPOS(n+1) to SPOS(n+2) of the reference data or in this section or after this section, and the index of the smaller one (start point) of the section in which the screw position Pr exist is adopted. In the processing of Steps f11 and f12, the determination is carried out on only the section from SPOS(n+1) to SPOS (n+2) and the sections before and after this section. It is adequate to perform the determination on these sections because the sampling period of the screw position is the same in obtainment of the reference data and in the actual metering process, and the index n indicating the section in which the screw position Pr exists at the start of the metering has been determined in Steps f3 to f10.

Thus, the index n for indicating the section in the reference data, in which the present screw position Pr exists, is definitely determined, and the present screw torque is subtracted from the screw torque STRQ(n) of the reference data to obtain the deviation ΔTRQ (Step f15), to proceed to Step c93 where the screw rotational torque command is corrected.

If the index n exceeds the total number of the sampling periods stored in the counter CNT, the deviation ΔTRQ is made "0" (Step f16), to proceed to Step c93 with no correction of the screw rotational speed command.

In the correction of the screw rotational speed on the basis of the screw position as shown in FIG. 13, the index of the smaller one of the section of the reference data, in which the screw position Pr exists, is adopted. However, the index of the larger one of the section of the reference data can be adopted. In this case, if the determination in Step f3 is NO, the index n is set to "1", and the index n is set to "2" in Step f8, set to "3" in Step f9, set to "k" in Step f10 and set to "k+1" in Step f7. If the determination in Step f11 is NO, the index n is set to "n+1", the index n is set to "n+2" in Step f13 and set to "n+3" in Step f14.

In the case where the screw rotational speed is corrected in accordance with the screw retracting speed on the basis of the position, the same main routine processing as that in FIG. 9 is performed and the processing of Step d9 is performed by modifying the processing of Step f15 to "ΔSPD←SSPD(n)−present screw retracting speed" and modifying the processing of Step f16 to "ΔSPD←0".

In the foregoing embodiments, the upper and lower limits are provided as ±10% of the present screw rotational speed with respect to the correction amount for the screw rotational speed command. However, these limits are not necessarily required, and only the upper limit may be provided since the excessive increase of the screw rotational speed raises a serious problem.

According to the present invention, the transition patterns of the screw rotational speed, screw retracting speed and screw retracting position are controlled to coincide with the reference data, to eliminate the dispersion of the metering time so that the metering process is performed for substantial constant time.

What is claimed is:

1. A method of controlling an injection molding machine, comprising:

detecting a rotational torque exerted on a screw;

storing the detailed rotational torque detected in a time series as a reference torque; and correcting a rotational speed of the screw based on the reference torque and the rotational torque of the screw detected.

2. The method of claim 1, wherein the correcting is limited by a lower correction amount and an upper correction amount.

3. The method of claim 1, wherein a plurality of reference torques are stored for a plurality of stages of operation.

4. The method of claim 1, further comprising:

detecting the speed of the screw, wherein the correcting further comprises correcting the rotational speed of the screw based on the speed of the screw detected.

5. A controller for an injection molding machine, comprising:

a detector that detects a rotational torque exerted on a screw;

a memory that stores the rotational torque detected by the detector in a time series from a start of a metering process as a reference torque; and a processor that corrects a rotational speed of the screw based on the reference torque and the rotational torque of the screw detected by the detector.

6. A controller for an injection molding machine according to claim 5, wherein the processor calculates a correction amount based on a deviation between the reference torque and the torque detected by the detector, and corrects a predetermined rotational speed command for the screw based on the correction amount.

7. A controller for an injection molding machine according to claim 6, wherein the processor restricts the correction amount not to exceed at least one of an upper limit, a lower limit and an absolute lower limit set for the correction amount.

8. A controller for an injection molding machine according to claim 6, wherein a plurality of values of the predetermined rotational speed command are respectively set for a plurality of stages of the metering process.

9. A controller for an injection molding machine, comprising:
- a torque detector that detects a rotational torque exerted on a screw;
- a position detector that detects an axial position of the screw;
- a memory that stores the rotational torque detected by the torque detector as a reference torque, with the axial position of the screw detected by the position detector to be associated with the rotational torque in a metering process; and
- a processor that corrects a rotational speed of the screw based on the reference torque stored in the memory and the rotational torque of the screw detected by the torque detector.

10. A controller for an injection molding machine according to claim 9, wherein the processor calculates a correction amount based on a deviation between the reference torque and the torque detected by the detector, and corrects a predetermined rotational speed command for the screw based on the correction amount.

11. A controller for an injection molding machine according to claim 10, wherein the processor restricts the correction amount not to exceed at least one of an upper limit, a lower limit and an absolute lower limit set for the correction amount.

12. A controller for an injection molding machine according to claim 10, wherein a plurality of values of the predetermined rotational speed command are respectively set for a plurality of stages of the metering process.

13. A controller for an injection molding machine, comprising:
- a detector that detects a retracting speed of a screw;
- a memory that stores the retracting speed detected by the detector in a time series from a start of a metering process as a reference retracting speed; and
- a processor that determines a correction amount for a rotational speed of the screw based on the reference retracting speed stored in the memory, a predetermined rotational speed and a retracting speed of the screw detected by the detector, restricts the correction amount to at least one of an upper limit, a lower limit and an absolute lower limit set for the correction amount, and corrects the rotational speed of the screw in accordance with the correction amount.

14. A controller for an injection molding machine according to claim 13, wherein a plurality of values of the predetermined rotational speed are respectively set for a plurality of stages of the metering process.

15. A controller for an injection molding machine, comprising:
- a retracting speed detector that detects a retracting speed of a screw;
- a position detector that detects an axial position of the screw;
- a memory that stores the retracting speed detected by the retracting speed detector as reference retracting speed, with the axial position detected by the position detector to be associated with the retracting speed; and
- a processor that obtains a correction amount for a rotational speed of the screw based on the reference retracting speed stored in the memory, a predetermined rotational speed and a retracting speed of the screw in an actual metering process, restricts the correction amount not to exceed at least one of an upper limit, a lower limit and the lower limit set for the correction amount, and corrects the rotational speed of the screw in accordance with the correction amount.

16. A controller for an injection molding machine according to claim 5, wherein a plurality of values of the predetermined rotational speed are respectively set for a plurality of stages of the metering process.

17. A controller for an injection molding machine, comprising:
- a position detector that detects an axial position of a screw;
- a memory that stores the axial position detected by the position detector in time series from a start of a metering process as a reference position; and
- a processor that corrects a rotational speed of the screw based on the reference position of the screw stored in the memory, a predetermined rotational speed and the axial position of the screw detected by the position detector.

18. A controller for an injection molding machine according to claim 17, wherein the processor calculates a correction amount based on a deviation between the reference position and the position of the screw in the actual metering process, and corrects a predetermined rotational speed command for the screw based on the correction amount.

19. A controller for an injection molding machine according to claim 18, wherein the processor restricts the correction amount to at least one of an upper limit, a lower limit and an absolute lower limit set for the correction amount.

20. A controller for an injection molding machine according to claim 18, wherein values of the rotational speed command are respectively set for a plurality of stages of the metering process.

* * * * *

UNITED STATES PATENT AND TRADEMARK OFFICE
CERTIFICATE OF CORRECTION

PATENT NO. : 6,365,075 B1
DATED : April 2, 2002
INVENTOR(S) : Masao Kamiguchi et al.

It is certified that error appears in the above-identified patent and that said Letters Patent is hereby corrected as shown below:

<u>Column 7,</u>
Line 39, "all" to -- a11 --.

<u>Column 8,</u>
Line 42, change "(Step c9)" to -- (Step c90) --.

Signed and Sealed this

Fourth Day of June, 2002

Attest:

Attesting Officer

JAMES E. ROGAN
*Director of the United States Patent and Trademark Office*